United States Patent
Gabel et al.

(10) Patent No.: US 10,183,888 B2
(45) Date of Patent: Jan. 22, 2019

(54) GLASS CERAMIC SUBSTRATE MADE OF A TRANSPARENT, COLORED LAS GLASS CERAMIC AND METHOD FOR PRODUCING IT

(71) Applicant: SCHOTT AG, Mainz (DE)

(72) Inventors: Falk Gabel, Schlangenbad (DE); Oliver Hochrein, Mainz (DE); Evelin Weiss, Mainz (DE); Roland Dudek, Bad Kreuznach (DE); Uwe Martens, Mainz-Kastel (DE)

(73) Assignee: SCHOTT AG, Mainz (DE)

( * ) Notice: Subject to any disclaimer, the term of this patent is extended or adjusted under 35 U.S.C. 154(b) by 118 days.

(21) Appl. No.: 14/757,392

(22) Filed: Dec. 23, 2015

(65) Prior Publication Data

US 2016/0176752 A1   Jun. 23, 2016

(30) Foreign Application Priority Data

Dec. 23, 2014 (DE) .......................... 10 2014 226 986

(51) Int. Cl.
  *C03C 3/097* (2006.01)
  *C03C 10/12* (2006.01)
  (Continued)

(52) U.S. Cl.
  CPC .......... *C03C 10/0027* (2013.01); *C03B 32/02* (2013.01); *C03C 3/097* (2013.01); *C03C 23/007* (2013.01)

(58) Field of Classification Search
  None
  See application file for complete search history.

(56) References Cited

U.S. PATENT DOCUMENTS

| 4,211,820 A | 7/1980 | Cantaloupe et al. |
| 4,218,512 A | 8/1980 | Allersma |

(Continued)

FOREIGN PATENT DOCUMENTS

| DE | 19939787 C2 | 11/2003 |
| DE | 102004024583 A1 | 12/2005 |

(Continued)

OTHER PUBLICATIONS

Weibull, "A statistical theory of the strength of materials," Ingeniörsvetenskapsakademiens Handlingar No. 151, pp. 1-45 (1939).

(Continued)

*Primary Examiner* — David Sample
(74) *Attorney, Agent, or Firm* — Ohlandt, Greeley, Ruggiero & Perle, L.L.P.

(57) ABSTRACT

A glass ceramic substrate made of a transparent, colored LAS glass ceramic is provided. The glass ceramic has a gradient layer with keatite solid solution and an underlying core with high-quartz solid solution as predominant crystal phase. The keatite solid solution in a depth of 10 μm or greater exceeds 50% of the sum of the high-quartz solid solution proportion and keatite solid solution proportion. The ceramization includes a crystal transformation step, in which the high-quartz solid solution is transformed at a maximum temperature in the range of 910° to 980° and a time period of between 1 and 25 minutes in part into the keatite solid solution.

19 Claims, 4 Drawing Sheets

(51) Int. Cl.
*C03C 23/00* (2006.01)
*C03B 32/02* (2006.01)
*C03C 10/00* (2006.01)

(56) References Cited

U.S. PATENT DOCUMENTS

| | | |
|---|---|---|
| 8,765,262 B2 | 7/2014 | Gross |
| 9,061,937 B2 * | 6/2015 | Siebers .................. C03C 3/087 |
| 2002/0026932 A1 | 3/2002 | Mitra et al. |
| 2005/0252503 A1 | 11/2005 | Siebers et al. |
| 2005/0255983 A1 * | 11/2005 | Becker .................. C03B 32/02 501/4 |
| 2007/0213192 A1 | 9/2007 | Comte et al. |
| 2010/0263525 A1 | 10/2010 | Siebers et al. |
| 2010/0304948 A1 | 12/2010 | Comte |
| 2012/0157290 A1 | 6/2012 | Gabel et al. |
| 2013/0224493 A1 * | 8/2013 | Gabel .................... C03B 32/02 428/410 |
| 2014/0238971 A1 | 8/2014 | Comte et al. |
| 2015/0239771 A1 | 8/2015 | Siebers et al. |

FOREIGN PATENT DOCUMENTS

| | | |
|---|---|---|
| DE | 102007025893 A1 | 12/2008 |
| DE | 102008050263 A1 | 4/2010 |
| DE | 102010006232 A1 | 2/2011 |
| EP | 1170264 A1 | 1/2002 |
| WO | WO-2010040443 A2 * | 4/2010 ............. C03C 3/087 |

OTHER PUBLICATIONS

ISO 14782: 1999.

* cited by examiner

GLASS CERAMIC SUBSTRATE MADE OF A TRANSPARENT, COLORED LAS GLASS CERAMIC AND METHOD FOR PRODUCING IT

CROSS REFERENCE TO RELATED APPLICATIONS

This application claims benefit under 35 U.S.C. § 119(a) of German Patent Application No. 102014226986.5 filed Dec. 23, 2014, the entire contents of which are incorporated herein by reference.

BACKGROUND OF THE INVENTION

1. Field of the Invention

The invention relates to a glass ceramic substrate made of a transparent, colored LAS glass ceramic and having a gradient layer and an underlying core. Keatite mixed crystals or solid solution (KSS) is present in the core as predominant crystal phase and high-quartz mixed crystals or solid solution (HQSS) is present in the gradient layer as predominant crystal phase. The invention further relates to a method for producing the glass ceramic substrate and the use thereof.

2. Description of Related Art

The production of generic LAS glass ceramics occurs in a plurality of stages. In large-scale industrial production thereof, as is known, the crystallizable starting glass of the system $Li_2O$—$Al_2O_3$—$SiO_2$ is first of all fused from a mixture of shards and powdered bulk raw materials at temperatures of usually between 1500° C. and 1650° C. Typically, refining agents such as arsenic oxide, antimony oxide, and/or tin oxide are employed as refining agents in the melt. The use of $SnO_2$ in conjunction with high-temperature refining above 1700° C. is described, by way of example, in DE 199 39 787 C2.

After fusion and refining, the glass usually undergoes hot forming by rolling or floating in order to produce plates. On the one hand, a low melting temperature and a low processing temperature PT are desired and, on the other hand, the glass may not exhibit any devitrification during forming, in order to achieve an economical production. This means that no interfering crystals, which may be detrimental to the strength and aesthetic appearance of the starting glasses and the glass ceramics produced from them may form. Because the forming takes place in the vicinity of the processing temperature PT (viscosity $10^4$dPas) of the glass, it must be ensured that the upper devitrification temperature of the melt lies in the vicinity of and favorably below the processing temperature, in order to prevent the formation of interfering crystals.

Afterwards, the starting glass is transformed in a known way by controlled crystallization into the glass ceramic article. This ceramization usually occurs in a two-stage process, in which, first of all, nuclei are created by nucleation at a temperature of between 680° C. and 800° C., usually from $ZrO_2/TiO_2$ solid solutions. $SnO_2$ can also participate in the nucleation. When the temperature is subsequently increased, the high-quartz solid solutions grow first of all on these nuclei. High crystal growth rates, such as those desired for an economical, rapid ceramization, are achieved for most compositions, depending on the type of structure, in the temperature range from 850° C. to 1200° C. At this maximum production temperature, the internal structure of the glass ceramic is homogenized and the optical, physical, and chemical properties of the glass ceramic are established. High-quartz solid solution is also referred to in the literature by the synonym "beta quartz" or "beta eucryptite."

It is also known that the high-quartz solid solutions in the $Li_2O$—$Al_2O_3$—$SiO_2$ system can undergo transformation into a keatite solid solution by a further ceramization process. Keatite solid solution is also referred to as "beta spodumene." The transformation into keatite solid solutions occurs for most compositions at temperatures up to 1200° C. by a reconstructive, irreversible phase transformation. As is known, the crystallites grow markedly during this phase transformation and, as a result of this, they form scattering centers, which lead to a translucence or opacity of the glass ceramics. Moreover, the transition from high-quartz solid solutions to keatite solid solutions is accompanied by an increase in the coefficient of thermal expansion of the glass ceramic.

"Transparent" in terms of this specification is understood to refer to glass ceramics that, in distinction to "translucent" or "opaque" glass ceramics, have only negligible proportions of scattered light in the visible wavelength range. Thus, transparency also refers to the "clearness" of the glass ceramic in contrast to the haze thereof. Under this aspect, transmission losses are ascribed to refraction at the crystals, phase boundaries, or inclusions and are therefore wavelength-dependent volume effects. Whereas a "translucent" LAS glass ceramic is understood to refer to one with a scattered-light proportion ("haze") of greater than 20% at a wavelength of 470 nm, measured in accordance with International Standard ISO 14782: 1999(E), standardized to a glass ceramic with a thickness of 4 mm, a "transparent" LAS glass ceramic is understood to refer to one with a scattered-light proportion of no more than 20%.

The LAS glass ceramic is referred to as "colored" in terms of this specification when, owing to one or a plurality of coloring metal oxides or colloids in its composition, it exhibits transmission losses in the visible wavelength range due to absorption. Here, too, wavelength-dependent volume effects are thus involved. In particular, the coloring can be so dark that non-luminous objects are not perceptible through the LAS glass ceramic with the naked eye, but, by contrast, luminous objects are visible. Accordingly, a colored glass ceramic can be referred to as being nontransparent and, according to the above definition, at the same time as being "transparent."

A typical application for the generic glass ceramic is, for example, cooktops, the requirements of which in practical use are very specific in terms of transmission properties and are even at times opposed to one another. For example, in order to block any interfering view of the technical components beneath the glass ceramic cooktop and to prevent the blinding effect of radiant heating elements, in particular bright halogen heating elements, glass ceramic cooktops are limited in terms of their integral transmission. On the other hand, during operation, even at low power, the radiant heating elements should be well visible. A certain light transmission is also required for display capability when, for example, light-emitting diodes are installed beneath the cooking plate. In order to satisfy these requirements, glass ceramic cooktops are usually adjusted to values of the integral transmission $\tau_{vis}$ of 0.5% to 5%. This is achieved by additions of coloring elements. When viewed from above, glass ceramic cooktops are then black in appearance, regardless of the coloring element used, on account of the low light transmission, but usually red, reddish violet, or brownish orange, depending on the coloring elements used, when viewed through the cooktop.

An earlier type of glass ceramic cooktops, known under the names Ceran Color®, manufactured by SCHOTT AG, possessed a good colored display capability. Ceran Color® is colored by additives of NiO, CoO, $Fe_2O_3$, and MnO and refined by $Sb_2O_3$. Through this combination of coloring oxides, an integral light transmission of typically 1.2% is adjusted for cooktops with a conventional thickness of 4 mm. The transmission in the range from 380 nm to 500 nm is 0.1-2.8%, depending on the wavelength. For a conventional wavelength of 630 nm in the case of red light-emitting diodes, the transmission is about 6%. A drawback of this earlier type of glass ceramic cooktops is that the coloring oxides used also absorb very strongly in the infrared. The IR transmission at 1600 nm is less than 20%. As a result, the rate of heating during cooking is reduced. The transmission curve of Ceran Color® is depicted in the book "Low Thermal Expansion Glass Ceramics," editor Hans Bach, Springer-Verlag Berlin Heidelberg 1995, on page 66 (ISBN 3-540-58598-2). The composition is listed in the book "Glass-Ceramic Technology," Wolfram Höland and George Beall, The American Ceramic Society 2002, in Table 2-7.

In more recent, enhanced glass ceramic cooktops, $V_2O_5$ is generally used for coloring, because it possesses the special property of absorption in the range of visible light and allows a high transmission in the range of infrared radiation. The coloring by $V_2O_5$ is a complex process. As has been shown in earlier investigations (DE 199 39 787 C2), the conversion of vanadium oxide to the coloring state requires a redox process to occur. In the crystallizable starting glass, the $V_2O_5$ is still a relatively weak colorant and results in a slightly greenish hue. During ceramization, the redox process occurs, the vanadium is reduced, and the redox partner is oxidized. The refining agent serves as the primary redox partner. This was shown by Mössbauer investigations on Sb-refined compositions as well as on Sn-refined compositions. During ceramization, a portion of the $Sb^{3+}$ or $Sn^{2+}$ in the starting glass is converted into the higher oxidation state $Sb_{5+}$ or $Sn^{4+}$, respectively. It may be assumed that the vanadium in incorporated into the single crystal in the reduced oxidation state as $V^{4+}$ or $V^{3+}$ and colors intensively therein owing to electron charge-transfer reactions. As a further redox partner, $TiO_2$ can also enhance the coloring by vanadium oxide. Besides the nature and amount of the redox partner in the starting glass, the redox state that is adjusted in the glass in the case of the melt also has an influence. A low oxygen partial pressure $pO_2$—for example, in a melt adjusted by high melting temperatures to be reducing—enhances the coloring effect of the vanadium oxide.

Both the LAS glass ceramics having KSS as well as those having HQSS as predominant crystal phase have long been known from various fields of application. For example, the majority of commercially available cooktops composed of LAS glass ceramic have HQSS as predominant crystal phase. The crystal phase proportion of these glass ceramics generally lies between 55 and 80 vol %. The mean crystallite sizes of the HQSS lie on average below 50 nm. These glass ceramics are therefore transparent and can be colored by color-imparting components such as those described above.

More seldom, cooktops composed of LAS glass ceramics having KSS as main crystal phase are employed. Such glass ceramics are not transparent, in particular in the wavelength range between 380 nm and 500 nm, but rather are translucent to opaque. Especially at high temperatures, at which the phase transformation for an economic industrial process takes place sufficiently rapidly, crystallites in the order of magnitude of >135 nm are formed, which lead to the strong light scattering described in the material. The phase content of the crystalline species of the translucent or opaque glass ceramic having KSS as main crystal phase lies between 70 and 95 vol %.

In concrete terms, for example, a translucent LAS glass ceramic with KSS as predominant crystal phase as well as a method for the production thereof is known from the specification U.S. Pat. No. 4,218,512 A. Starting from a non-ceramized precursor glass, the method described therein comprises the steps of heating the glass product to a first temperature of greater than 700° C., at which a transformation into a glass ceramic with HQSS as predominant crystal phase is induced. Afterwards, the temperature is raised to a second value of greater than 860° C., at which the high-quartz solid solutions are transformed into keatite solid solutions, with the heating time and residence time in this phase amounting to several hours. This processing procedure has economic drawbacks, because the total processing time is >10 hours. For the cited exemplary embodiment, 20 hours were given in fact. It is also known from this specification that, in this way, it is possible to keep a layer of about 40 μm in thickness on the surface, in which the HQSS continues to be present as predominant crystal phase. It is further known from this specification that high-quartz solid solutions have a smaller coefficient of thermal expansion than keatite solid solutions.

Another translucent glass ceramic having KSS as predominant crystal phase is known from the specification EP 1 170 264 A1. According to this specification, the ceramization took place initially at a crystallization temperature of 750° C. to 900° C. for creation of the HQSS phase and, after a further temperature increase in a range of 900° C. to 1200° C. for transformation of the latter into a KSS phase. This specification, too, indicates that high-quartz solid solutions form on the surface as dominant crystal phase. In this case, special attention is paid to the absence of any transformation into a deep-quartz structure at the surface, so as to prevent stresses that are too high in the surface, which might in some cases result in a tendency toward crack formation in the surface and thus could lead to weakening of the material.

Another specification, which deals with the generic type of translucent glass ceramic having KSS as main phase, is DE 10 2004 024 583 A1, in which the ceramization of the glass ceramic also occurs in two steps. First of all, the crystallization of high-quartz solid solutions is carried out at a temperature of 840° C. and, subsequently, at a maximum temperature of between 1070° C. and 1094° C., a transformation into keatite solid solutions is completed. The impact strength of the glass ceramic product produced in this way is determined by a ball drop test on a glass ceramic sheet that is 4 mm in thickness by means of a steel ball with a weight of 200 g, which is allowed to drop onto a 100×100 mm² cutout section of a test piece. Fracture drop heights of between 25 and 29 cm were determined in this way.

Translucent or opaque glass ceramics having KSS as predominant crystal phase are also known from Patent Application US 2007/0213192 A1, which proposes a ceramization at a maximum temperature of 900° C. to 1050° C. and a residence time of at least 10 min.

It is also known from the specification U.S. Pat. No. 4,211,820 that LAS glass ceramics having keatite solid solution as predominant crystal phase are suitable as colored glass ceramic for use as a cooktop. As is generally known, this specification also reveals that the formation of KSS as dominant crystal phase in the core of the glass ceramic and the presence of HQSS as dominant crystal phase in the surface thereof leads to a strengthening of the entire glass ceramic on account of the stress distribution. Moreover, it is found that, at ceramization temperatures of a maximum of 900° C. to 950° C., it is possible to observe the onset of a very weak scattering. In general, according to the specification, the growth of beta-spodumene crystals must be prevented in the region close to the surface, since this would otherwise result in translucent or even opaque products. In fact, the specification addresses an essentially transparent glass ceramic. However, the determined crystal sizes are given as being less than 1 μm or mostly less than 500 nm, which indeed indicates a translucent glass ceramic in terms of the above definition.

Yet another specification, which deals with a translucent glass ceramic having KSS as dominant crystal phase in the core and HQSS as dominant crystal phase in a gradient layer, is DE 10 2010 006 232 A1. The glass product is heated rapidly during the ceramization to a maximum temperature of 1080° C. to 1300° C., held at the maximum temperature for at most 2 min, or preferably immediately cooled back to room temperature. It is possible in this way to manufacture glass ceramics with high impact strength and a high temperature difference strength and having a lightness value of L*>95.

Finally, the specification US 2014/0238971 A1 deals with a glass ceramic having keatite solid solutions as main crystal phase. In the specification, it is recognized that the glass ceramic can also contain a proportion of high-quartz solid solution. The ceramization takes place at a maximum temperature of 950° C. to 1060° C. over a time period of 5 to 15 min. The glass composition contains $Fe_2O_3$ in combination with $Cr_2O_3$ as coloring components, in order to obtain a brownish-gray coloration after the ceramization. In the process a lightness value L* of between 25 and 45 is sought, that is, a translucent to opaque glass ceramic.

As in the case of the above list of exemplary specifications relating to translucent glass ceramics with KSS as main crystal phase in the core, there are also a large number of disclosures regarding glass ceramics with HQSS as predominant crystal phase in the core. By way of example, reference is made here only to the specification DE 10 2008 050 263 A1. The glass ceramic disclosed therein is transparent and colored. The ceramization takes place at a maximum temperature of 940° C. for a residence time of 15 min at most.

Moreover, it is known from the specification DE 10 2007 025 893 A1 that it is also possible to produce LAS glass ceramics having keatite solid solution as predominant crystal phase that are transparent. More specifically, the specification has as its subject a glass ceramic with keatite solid solutions as predominant crystal phase in a proportion of 60 to 98 vol %, which is intended for antiballistic armor and therefore requires an especially high strength. At the same time, it is established in the specification that, through appropriate choice of the starting glass and temperature control during the ceramization, it is also possible to produce such a glass ceramic that is transparent in terms of the Andrejev-Hoppe model as well as in terms of the Rayleigh-Ganz model. Made responsible for the transparency in this case is the formation of small crystals with a mean crystal radius of <30 nm. Furthermore, it is possible to adjust the difference in refraction value of the KSS from that of the remainder of the glass phase, in particular, by means of the component ZnO, this also being helpful in order to optimize the transparency. The glass ceramic is not colored.

SUMMARY

Summarizing the results, it can be established that the ceramization conditions have an influence on the light scattering associated with KSS formation, on the one hand, and, on the other hand, high ceramization temperatures and longer ceramization times lead to a more intense coloring due to the vanadium oxide that is present. Both can have a negative effect on the display capability. In addition, the transmission behavior of colored glass ceramics is, under both aspects, dependent on wavelength. Efforts to improve the operating comfort and the technical functions of appliances by use of multicolored displays of as many possible color designs as possible and/or to afford appliance manufacturers the possibility for differentiation due to the color design therefore repeatedly encounter technical difficulties. Besides a good adjustment of the absorption, also a low light scattering in the material would be important for the display capability of, for example, so-called "seven segment displays" or TFT displays. Too many scattering centers in the material lead to blurriness of the display and are therefore detrimental to this application.

Glass ceramics for cooktops must include a variety of further properties in addition to transparency and coloring. In particular, a coefficient of thermal expansion (referred to as CTE or also α) that is as small as possible is important, because, in this way, the requisite temperature difference strength (TUF) is strongly influenced. LAS glass ceramics with HQSS as main crystal phase are characterized by a very low CTE(20/700° C.) of about 0-0.5 ppm/K; LAS glass ceramics with KSS as main crystal phase are characterized by a slightly higher CTE(20/700° C.) of about 0.8-1.5 ppm/K.

Furthermore, the mechanical strength—first and foremost, the impact strength—of cooktops plays a large role. In order to fulfill the requirements placed on their impact strength in accordance with national and international safety standards, such as, for example, EN 60335 or UL 858 or CSA 22.2, cooktops made of LAS glass ceramics usually require material thicknesses of □ 3.8 mm. Fundamentally, thinner flat glasses would be desirable just on account of material savings. However, the ability to withstand impacts also decreases with the thickness. The indentation of the cooktop that arises in the case of an impact load and the tensile stresses on the underside thereof associated with it increase markedly with decreasing thickness of the cooktop. In order to fulfill nonetheless the standard requirements placed on impact strength, therefore, an increased strength of the underside of the cooktop, which is sufficient to withstand the higher tensile stresses, is required.

Accordingly, the object of the present invention is to make available a glass ceramic, as well as a method for the production thereof, that has a material input that is as small as possible and, moreover, exhibits adequate optical transparency and coloring capability for a large number of applications.

The object is achieved by a glass ceramic substrate made of a transparent, colored LAS glass ceramic with the following composition (in wt %):

| | |
|---|---|
| $Al_2O_3$ | 18-23 |
| $Li_2O$ | 3.0-4.2 |

-continued

| | |
|---|---|
| $SiO_2$ | 60-69 |
| ZnO | 0-2 |
| $Na_2O + K_2O$ | 0.2-1.5 |
| MgO | 0-1.5 |
| CaO + SrO + BaO | 0-4 |
| $B_2O_3$ | 0-2 |
| $TiO_2$ | 2.3-4 |
| $ZrO_2$ | 0.5-2 |
| $P_2O_5$ | 0-3 |
| $SnO_2$ | 0-<0.6 |
| $Sb_2O_3$ | 0-1.5 |
| $As_2O_3$ | 0-1.5 |
| $TiO_2 + ZrO_2 + SnO_2$ | 3.8-6 |
| $V_2O_5$ | 0.01-0.06 |

$Fe_2O_3$ 0.03-0.2 and, if need be, further coloring oxides, in sum total up to a maximum of 1.0 wt %, having a gradient layer close to the surface and an underlying core, wherein the LAS glass ceramic has keatite solid solution (KSS) in the core as predominant crystal phase and high-quartz solid solution (HQSS) in the gradient layer as predominant crystal phase, and wherein the KSS crystal phase proportion in any depth ≥20 μm, preferably in any depth ≥15 μm, and most preferably in any depth ≥10 μm, exceeds 50% of the sum total of the HQSS and KSS crystal phase proportions.

In the following, for simplicity instead of the "glass ceramic substrate according the invention," a "glass ceramic according to the invention" will be mentioned, even though the material "glass ceramic" is not meant, but just the substrate produced from it.

Surprisingly, it has been found that, from an LAS glass ceramic, the crystal layer structure or profile of which is adjusted as above and was produced using the method described below, it is possible to produce a glass ceramic substrate that has a hitherto not described combination of high strength and suitable coloring capability in the visible wavelength range with, at the same time, a low scatter (haze). Because of this, the substrate according to the invention is particularly suitable for application as a cooktop, thinner than 3.8 mm, preferably with a thickness of no more than 3.2 mm, and with sufficient optical transparency for light indicators and displays.

The glass ceramic substrate according to the invention, made of a transparent, colored LAS glass ceramic with the above composition and with a gradient layer close to the surface and an underlying core, wherein the LAS glass ceramic has a keatite solid solution (KSS) in the core as predominant crystal phase and a high-quartz solid solution (HQSS) in the gradient layer as predominant crystal phase, can therefore also be defined by an impact strength, expressed by a "CIL" value of at least 0.8 N, wherein the CIL value corresponds to a load of said at least 0.8 N with which, under an ambient humidity of 10%, a Vickers indenter is pressed into the surface of the glass ceramic, wherein, in at least 10 tests, 2 cracks arise on average starting from the edges of an indent created in this way.

It is known to the person skilled in the art that the ambient humidity has an influence on the CIL value due to the physical process of stress crack corrosion. For example, this leads to the fact that the same glass-ceramic substrate measured under a lower ambient humidity has a higher CIL value than in the case of a higher ambient humidity. The glass-ceramic substrate according to the invention accordingly preferably has a CIL value of at least 0.98 N in the case of an ambient humidity of 1%.

On account of the increased specific strength, it is possible for the first time to produce a transparent, colored glass ceramic with a thickness of only 3 mm and in any case no greater than 3.2 mm with the same total load capability as that of conventional glass ceramic panels with a thickness of 4 mm. This results in a potential material savings of at least 20% or a corresponding increase in strength for the same thickness.

Further, it is possible to dispense with a "knobbing" on the bottom side of the cooktop, which is ordinarily employed among other things for the purpose of increasing strength. The glass-ceramic substrate according to the invention is accordingly more preferably made to be smooth on both sides.

BRIEF DESCRIPTION OF THE DRAWINGS

These and further advantages and properties of the glass ceramic substrate according to the invention and of the method according to the invention will be explained below on the basis of figures. Shown are.

DETAILED DESCRIPTION

For measurement of the fracture strength, the "crack initiation load" ("CIL") test method, which is known as such, is employed first and foremost; see, for example, U.S. Pat. No. 8,765,262 A. It provides that a sample of the glass ceramic fixed in placed in a holder, which has preferably been flushed with nitrogen, is subjected to a point load by means of a material testing device (Micro-Combi Tester of CSM) with a V-I-O3 Vickers indenter. The specified load is increased linearly within 30 seconds to a chosen maximum value and then reduced in the same time without any residence time. On account of the load, starting from the corners of the pyramidal indent of the Vicker indenter, 0 to 4 cracks can form in the glass ceramic. The chosen maximum value of the load is increased in steps until, with each indent, 4 cracks arise. At each force, at least 10 measurements are performed in order to be able to recognize variation of crack formation, which is also dependent on the existing surface (prior damage). The mean value is obtained from the number of cracks at the same force.

The sample preferably remains in the holder during the measurement until counting of the cracks is complete. The investigation is preferably carried out under nitrogen atmosphere in order to prevent as much as possible any subcritical crack growth due to the moisture of the ambient air.

Figure 1:
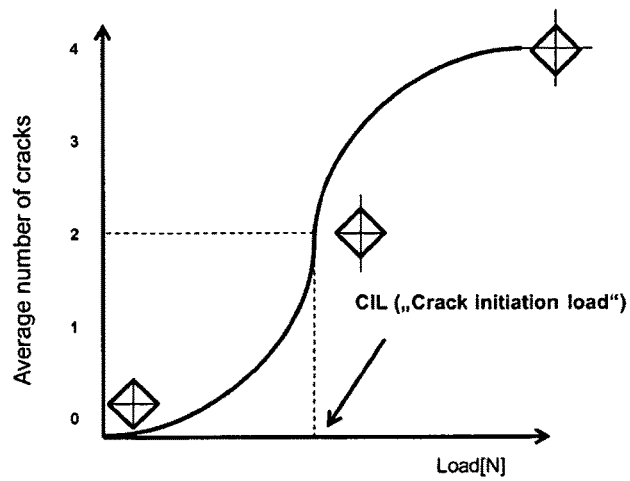
FIG. 1 is a diagram for illustrating the determination of fracture strength according to the "CIL" test.

What is thus determined each time in several tests is the number of cracks starting from the corners of the indent of the Vicker indenter as a function of the applied load. The determined numbers of cracks are plotted in a diagram in relation to the indent force and the load/crack curve is fitted to a Boltzmann function, as is illustrated in FIG. 1. Finally, the CIL value of the load at which 2 cracks arise on average is read off this curve and output as characteristic value for the impact strength. Three measurement points are illustrated in FIG. 1 by way of example.

According to the invention, the load that is determined under an ambient humidity of 10% is at least 0.8 N, and the load that is determined under an ambient humidity of 1% is at least 0.98 N. The strength of the glass ceramic according to the invention and, in particular, the impact strength, which is important for the glass ceramic substrate of a cooktop (cf. EN 60335, UL 858, or CSA 22.2), however, can be determined in another way.

An alternative certified test method for determining the impact strength is the so-called ball drop test (see, for example, DE 10 2004 024 583 A1). The test is performed on square cutout pieces of the size 100 mm×100 mm of a glass ceramic panel to be tested. The measurement of the impact strength is carried out based on DIN 52306. In this case, the measured sample is placed in a test frame and a steel ball weighing 200 g and having a diameter of 36 mm is allowed to drop onto the center of the sample. The drop height is increased in steps until fracture occurs. On account of the statistical character of the impact strength, this test is conducted on a series of at least 10 samples. The mean value, the standard deviation, and/or the 5% fractile of the measured value distribution are or is determined as the characteristic values for strength. The last value gives the drop height at which 5% of the tested samples are fractured.

It is known that the impact strength of a plate made of glass or glass ceramic is governed, among other things, by more or less incidental surface damage. These surface damage influences on the strength, which are difficult to control because of their incidental nature, usually lead to a high standard deviation of the measured value distribution and can thus severely falsify any comparative evaluation of the impact strength of different test lots. A possible recourse is to enlarge the statistical scope of the test, which, under these circumstances, may entail a substantial effort. Another possibility, which has become established among circles of experts consists in subjecting the surface of the plate made of glass or glass ceramic to surface pretreatment, which is identical for all test lots, in the form of defined prior damage. In the examples described below, this prior damage consists of a single scratch, which is made in the center on the bottom side of the measured sample opposite the contact point of the ball impact on the top side. The scratch is made with a diamond point, which, in this case, is a Knoop indenter, by passing this diamond point parallel to its longer axis with a constant applied force of 0.12 N and at a constant speed of 20 mm/min over a length of at least 10 mm in a straight line over the surface of the measured sample.

The impact strength of the LAS glass ceramic that has been subjected to contact damage of this kind can be determined by means of the ball drop test in the way described above. The standard deviation of typically less than 10% is only relatively still small, so that the measurement is available for a reliable statistical evaluation, while, at the same time, allowing a reasonable scope of test lots.

Figure 2A:
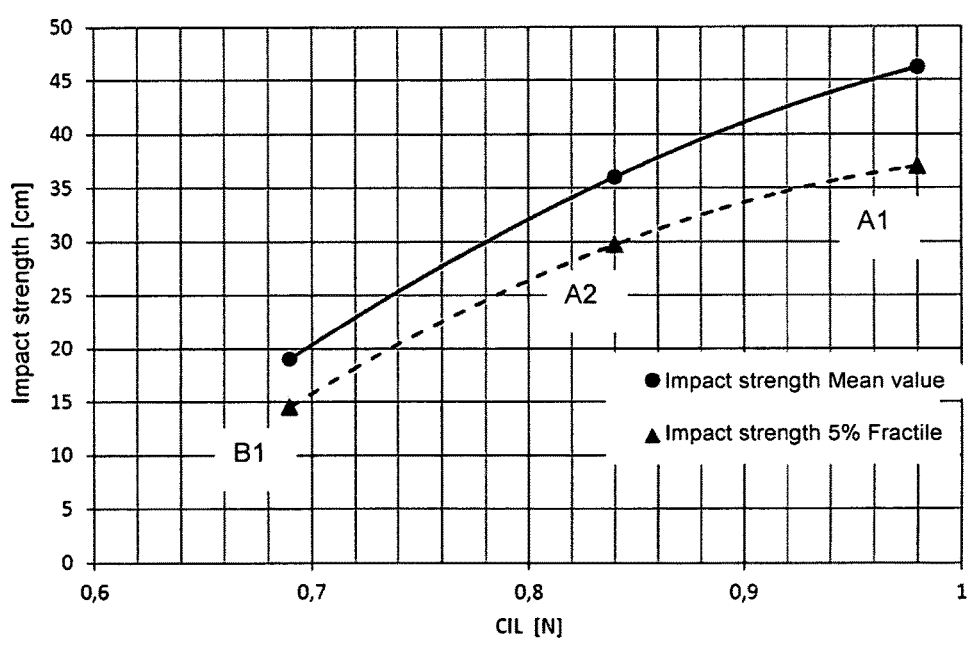
FIG. 2a is a diagram for comparing the determined fracture strength according to the CIL test under an ambient humidity of 10% and according to a ball drop test on two samples according to the invention and on a comparative sample.
Figure 2B:
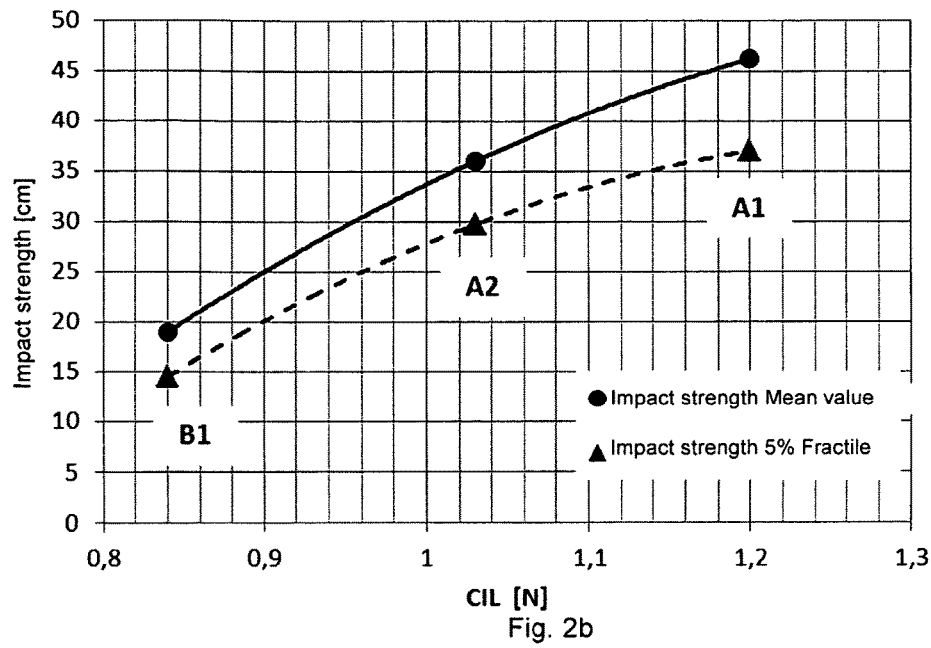
FIG. 2b is a diagram for comparing the determined fracture strength according to the CIL test under an ambient humidity of 1% and according to a ball drop test on two samples according to the invention and on a comparative sample.

The measurement results determined using the described CIL test and the described ball drop test on samples subjected to prior damage are plotted in FIGS. 2a and 2b in two diagrams for comparison with one another. In each case, two glass ceramics or glass ceramic substrates A1 and A2 according to the invention and one comparative ceramic B1 with HQSS as predominant crystal phase in the core were tested. Whereas the CIL measurements according to FIG. 2a were conducted under an ambient humidity of 10%, the CIL measurements according to FIG. 2b were taken under an ambient humidity of 1%. The ball drop tests were carried out under ordinary every day conditions at an ambient humidity of about 50% and were not varied, since the ambient humidity has no significant influence on the ball impact strength. The results of the CIL tests are each read off the x-axis, those of the ball drop test off the y-axis. Both the mean value determined in the ball drop test, shown as round measured points and connected by a solid line, and also the 5% fractile, shown as triangular measured points and connected with a dashed line, are plotted. A significant agreement of the characteristic values determined by the two methods is found. The 5% fractile lies, as expected, at a somewhat lower value than the respectively assigned mean value of the drop height. The left measured point pair represents the comparative ceramic B1; the two right measured point pairs each represent one of the exemplary embodiments A1 and A2. In both measurement methods, the two glass ceramics with the layer structure according to the invention proved to have a markedly higher fracture strength than the comparative ceramic. Thus, for a cooktop with a thickness of 4 mm in the ball drop test for the exemplary embodiment A1 according to the invention, an impact strength of 46±6 cm (mean value±standard deviation) and 37 cm (5% fractile) was determined. For the comparative product B1 made of a transparent, colored glass ceramic also with HQSS as predominant crystal phase in the core, by contrast, only 19±3 cm (mean value±standard deviation) and 14 cm (5% fractile) was determined. The drop height for A2 could be increased relative to the comparative example by approximately 90% and for A1 by approximately 142% in fact. Both of the examples according to the invention markedly exceed the required CIL limit value of 0.8 N for 10% ambient humidity or of 0.98 N for 1% ambient humidity.

But not just for the comparative ceramic B1 with HQSS as predominant crystal phase in the core, but also for known translucent or opaque glass ceramics with KSS as main crystal phase, the impact strength lies in a markedly lower range after defined prior damage than for the glass ceramic according to the invention or the glass ceramic substrate. For example, a drop height of only 29±6 cm was determined in the described way in the ball drop test of the above-described kind for the examples B2 and B3 mentioned below in Table 2.

The CIL limit value of 0.8 N for 10% ambient humidity or of 0.98 N for 1% ambient humidity corresponds to a mean height in the ball drop test of about 32 cm and a 5% fractile of about 26 cm. Preferably, the ball drop height determined in the ball drop test on a glass ceramic according to the invention, which has been subjected to defined prior damage as described above, is therefore at least 30 cm (mean value)

and/or 25 cm (5% fractile) and most preferably at least 40 cm (mean value) and/or 35 cm (5% fractile).

Whereas the determination of the impact strength has direct relevance as the standard specification for cooktops—reference is once again made to EN 60335, UL 858, or CSA 22.2—there is no stipulation of a standard for the bending strength as another characteristic value for characterization of the mechanical strength. Nonetheless, the determination of the bending strength is another appropriate parameter measurement, on the basis of which it is possible to demonstrate an increase in strength due to the process according to the invention. The bending strength test, which is therefore carried out additionally in some cases, is conducted as a double ring test in accordance with EN 1288 Part 5 (R45). A glass ceramic cooktop with a thickness of 4 mm in the design according to the invention achieves a characteristic bending strength of 236 MPa for a Weibull modulus of 6.0 in the bending strength test with subsequent evaluation according to the Weibull model. In comparison to the comparative ceramic with HQSS as predominant crystal phase in the core of the same thickness with a characteristic bending strength of 171 MPa for a Weibull modulus of 7.3, this is a significant increase and confirms the overall strength-enhancing effect of the layer structure according to the invention and the crystal content. The use of the Weibull model for the statistical analysis of strength measurements is generally known among circles of experts from, for example: W. Weibull, "A statistical theory of the strength of materials," Ingeniörsvetenskapsakademiens Handlingar No. 151, 1-45 (1939).

The bending strength was also determined in this way on B2 for comparison. The result is a confirmation: the Weibull analysis gave a value of 131 MPa, which in fact lies below the value for the HQSS glass ceramic.

All analysis methods thus confirm that the specific strength and, in particular, the specific impact strength, which is very relevant for application as a cooktop, turns out to be extraordinarily high for the glass ceramic of the substrate according to the invention and enables a total load capability that is comparable to that for conventional glass ceramic panels with a thickness of 4 mm, even starting at a thickness of no more than 3.0 mm.

Responsible for this is the specific crystal layer structure or the profile of the glass ceramic, the determination of which is explained below. The KSS crystal phase proportion and the HQSS crystal phase proportion are measured as a function of the depth. The crystal phase proportions are given here always in vol % and the mean crystallite sizes in nm. The crystal phase proportions are determined by means of thin-layer XRD (X-ray diffraction) on intact samples of the glass ceramics or by means of powder XRD on powders prepared from them. The reflections that are characteristic for the respective crystal phase (HQSS or KSS) were measured and the crystal phase proportion was determined from the integral areas of the reflections. These integral areas were related to those of standard samples with known phase content and the proportions of the crystal phases and of the other phases amorphous to X-rays were thereby determined. The crystallite sizes given herein were determined via the reflection broadening according to the so-called Scherrer formula in relation to a standard. According to experience, the relative errors in measurement lie at 10% with respect to the phase content and at 5% with respect to the crystallite size.

Figure 3:
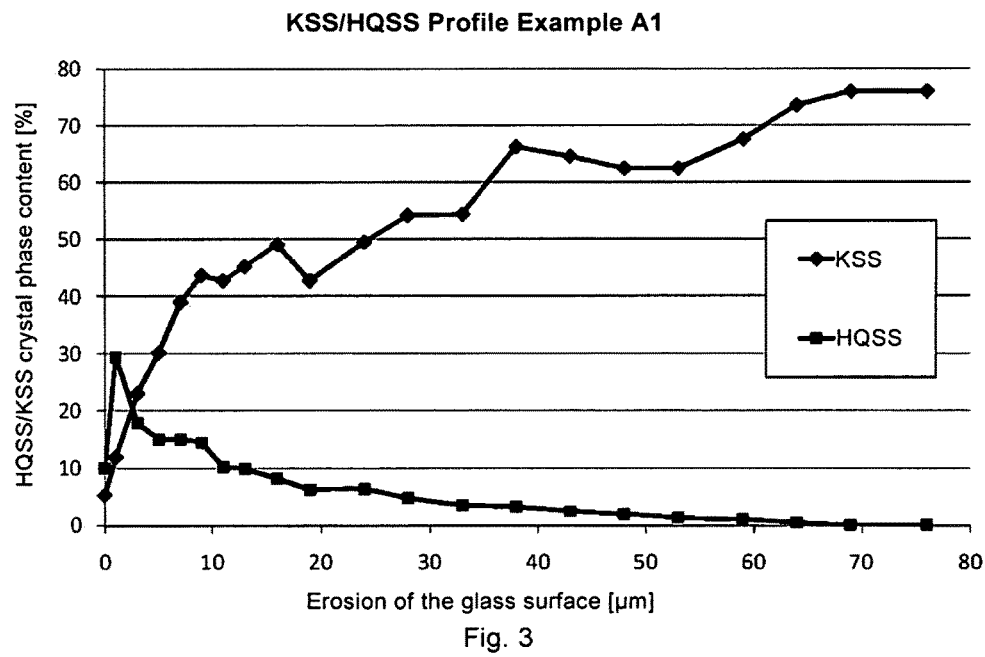
FIG. 3 is a diagram of the crystal phase proportions of HQSS and KSS as a function of the depth, measured on a first sample according to the invention, measured by means of thin-layer XRD.
Figure 4:
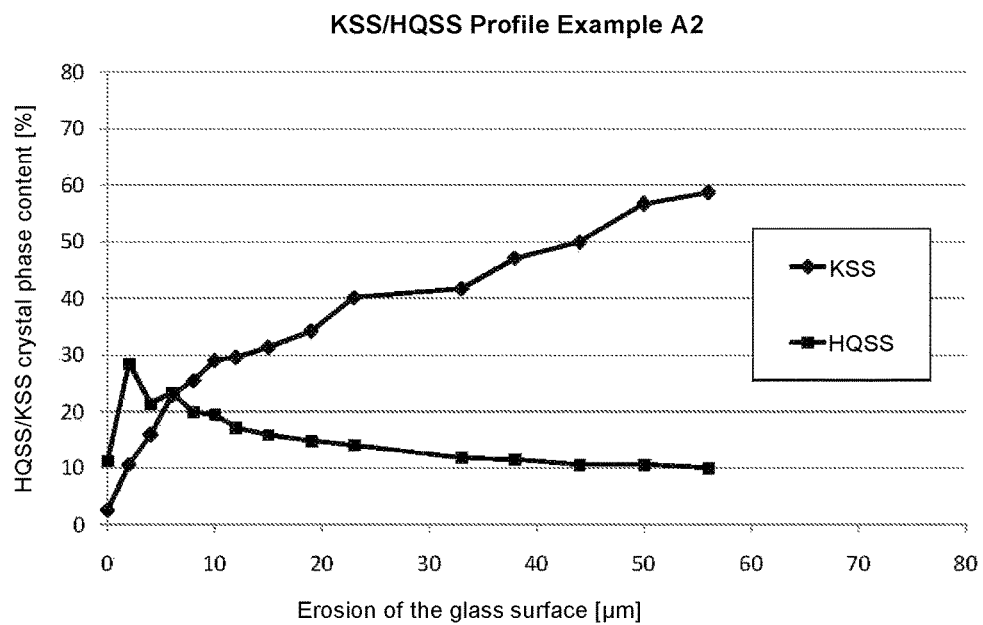
FIG. 4 is a diagram of the crystal phase proportions of HQSS and KSS as a function of the depth, measured on a second sample according to the invention, measured by means of thin-layer XRD.
Figure 5:
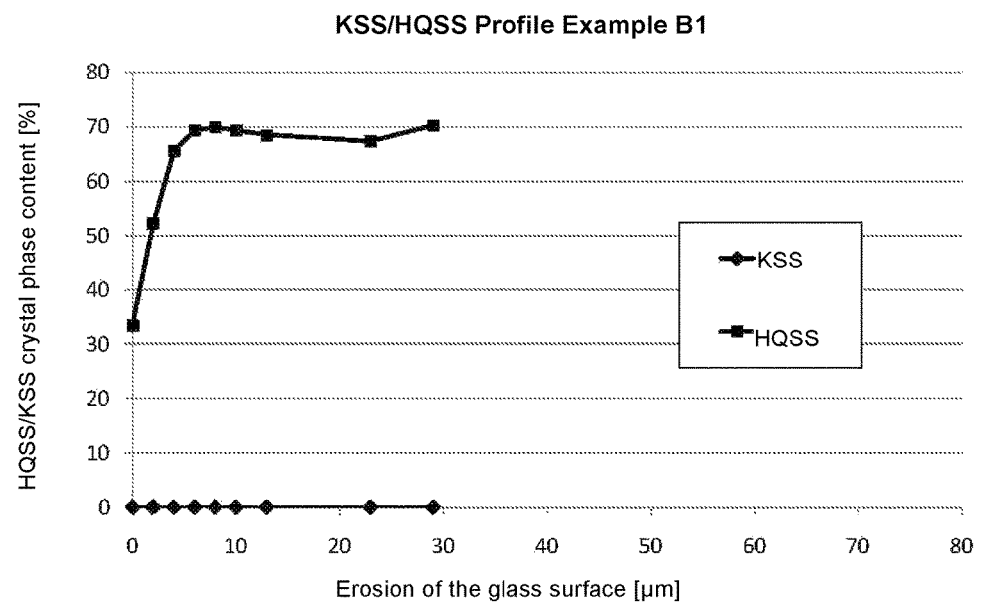
FIG. 5 is a diagram of the crystal phase proportions of HQSS and KSS as a function of the depth, measured on a comparative sample, measured by means of thin-layer XRD.

FIGS. 3 to 5 each show a diagram or depth profile of the crystal phase proportions of HQSS and KSS as a function of the depth, measured on a first example of a sample according to the invention, A1 (FIG. 3), a second example of a sample according to the invention, A2 (FIG. 4), and a comparative example of a ceramic B1 with HQSS as predominant crystal phase in the core (FIG. 5). The crystal phase proportions are each plotted in the y-direction in %, and the depth, starting from the surface of the glass ceramic sample, in the x-direction in μm. The glass ceramics were each measured in grazing incidence of less than 0.5° by means of X-ray diffraction. The depth information of such a measurement lies at about 2 μm according to experience. Afterwards, the samples were polished in succession and measured once again by means of XRD in order to determine the corresponding phase contents in deeper layers.

The diagrams show that, for the exemplary embodiments A1 and A2, the HQSS proportion initially increases slightly in a first segment. This increase may be ascribed to the known glassy zone of the surface of the glass ceramic that is several 100 nm to maximally 1 μm thick, in which no crystallites are present. However, because the XRD measurement is integrated in each measurement step over a depth information of about 2 μm, the content of HQSS within the first 2 μm enters into the measured value at the surface, which, accordingly, is not determined with 0% in the scope of measurement error. The proportion of the HQSS phase then decreases each time successively in the direction of the core. In opposition to this, the proportion of the KSS in the direction of the core increases each time. In the case of A1, the proportion of the KSS at about 76 μm corresponds to the proportion of the "bulk value" of approximately 75%, which is determined in a depth of 2000 μm. The HQSS at 76 μm has, at the same time, dropped to the bulk value of 0% at a depth of 2000 μm. In the case of the exemplary embodiment A2, the proportion of HQSS drops only to 10%, and the bulk value in a depth of 2000 μm is reached here at about 56 μm. Correspondingly, at this depth, the maximum value for KSS is reached at 59%. Moreover, so-called X-ray-amorphous phases lie in the layers, that is, phases that cannot be detected by means of X-ray diffraction, such phases also including, in particular, the glass phase.

Both exemplary embodiments show that the intersection point of the curves that represent the HQSS phase proportion and the KSS phase proportion lies between 0 and 10 μm and, more specifically, between 2 and 8 μm and thus, in any case, lies below 10 μm. In other words, the KSS crystal phase proportion exceeds 50% of the sum of the HQSS and KSS crystal phase proportions at the latest in a depth of 10 μm and beyond.

In the comparative example B1, by contrast, it can clearly be seen that no KSS is present in the material, and the HQSS already reaches its maximum bulk value of 70% in a depth of 2000 μm at 29 μm.

Figure 6:
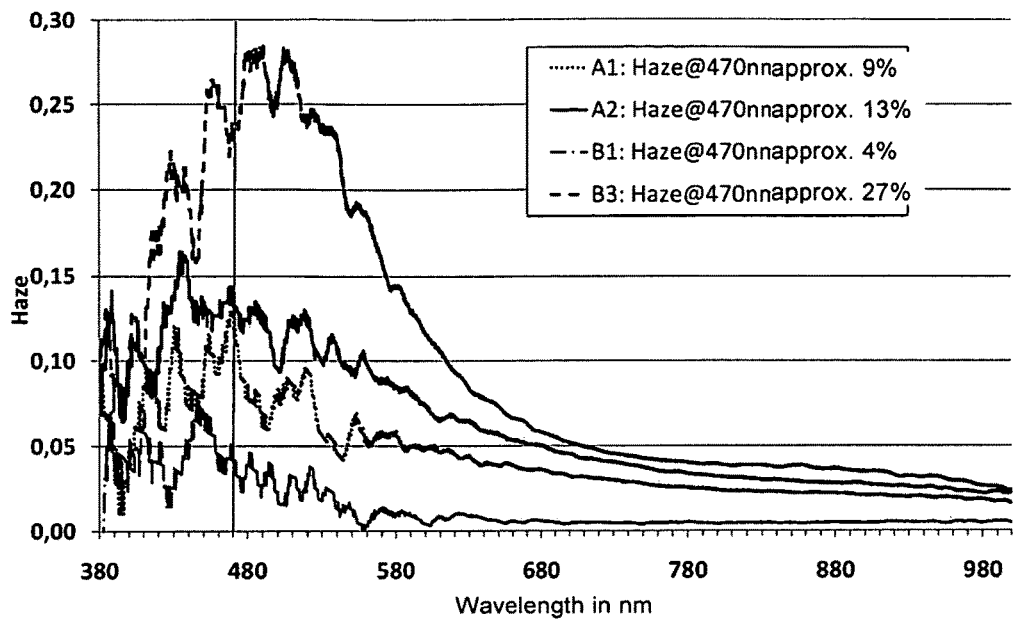
FIG. 6 is a diagram of the measurement of scattered light ("haze") on two samples of the glass ceramic according to the invention and two comparative samples.

At the same time, in spite of the KSS formation in the core, the glass ceramic according to the invention is transparent and thus is also fundamentally well suited for multicolored displays, in particular, in the absence of interfering scattering centers. The transparency is determined by means of a scattered-light measurement in accordance with International Standard ISO 14782: 1999(E), standardized in each case to a glass ceramic with a thickness of 4 mm. The result of this scattered-light measurement in a wavelength range from 380 nm to 1000 nm is illustrated in a diagram in FIG. 6. The measurement was carried out on the two samples A1 and A2 according to the invention and two reference samples B1 and B3. Whereas, as expected, the comparative sample B1 with HQSS as predominant crystal phase in the core of the glass ceramic exhibits a lower scattered-light proportion, referred to herein as "haze," of approximately 4% at a wavelength of 470 nm, the value for the translucent comparative sample B3 with KSS as predominant crystal phase in the core of the glass ceramic is very high at approximately 27%. In contrast to this, the maximum scattered-light proportion of the glass ceramics A1 and A2 according to the invention at a wavelength of 470 nm is approximately 9% and approximately 13%, respectively, determined in each case on a fit to the measurement curves illustrated in FIG. 6. The maximum scattered proportion in the entire wavelength range from 400 nm to 500 nm does not exceed the value of 17%, either, and thus lies in the range of transparency.

In order to arrive at the suitability of the glass ceramic for multicolored displays, the maximum scattered-light proportion ("haze"), determined in accordance with International Standard ISO 14782: 1999(E), standardized to a glass ceramic with a thickness of 4 mm and at a wavelength of 470 nm, is therefore preferably at most 15%, most preferably at most 12%.

It is further preferred that the maximum scattered-light proportion ("haze"), determined in accordance with International Standard ISO 14782: 1999(E), standardized to a glass ceramic with a thickness of 4 mm, does not exceed 20% in a wavelength range from 400 nm to 500 nm and most preferably does not exceed 17%.

Besides the transparency, the glass ceramic must have an adequate coloring as well, taking into consideration a good display capability; that is, it must bring about transmission losses through absorption in the visible wavelength range. The coloring should, in particular, be so dark that non-luminous objects are not perceptible with the naked eye through the LAS glass ceramic, but luminous objects are visible. A measurement parameter that represents this property is the integral transmission $\tau_{vis}$ in the visual spectral range. $\tau_{vis}$, also referred to as Y, "brightness," or "luminance," is calculated from the transmission spectrum in the wavelength range 380 nm to 780 nm. To this end, the measured spectrum is convoluted with the emission spectrum of a standard light source (D65) and with the green proportion of the so-called "tristimulus" of the CIE color system.

For the integral transmission of the glass ceramic according to the invention in the visible spectral range, standardized to a glass ceramic with a thickness of 4 mm, the following preferably holds: $\tau_{vis,\ 4\ mm} \leq 5\%$.

This parameter adjustment ensures an adequate darkening of the non-luminous components located beneath the glass ceramic.

Furthermore, the spectral transmission $\tau_{470\ nm,\ 4\ mm}$ of the glass ceramic according to the invention, standardized to a glass ceramic with a thickness of 4 mm, is preferably greater than 0.1% at a wavelength of 470 nm.

Finally, the spectral transmission $\tau_{550\ nm,\ 4\ mm}$ of the glass ceramic according to the invention, standardized to a glass ceramic with a thickness of 4 mm, is preferably greater than 0.25% at a wavelength of 550 nm.

The two last-mentioned parameter adjustments ensure separately an improved display capability and together an especially good color display capability. The invention thus combines for the first time properties that were until now not held to be reconcilable, such as a high strength, on the one hand, and a good display capability, owing to a low scatter and suitable transmission properties, on the other hand. It is therefore suitable to a special degree for applications with high aesthetic demand, such as cooktops or display and control panels. In the process, it makes possible an increase in the impact strength of the material as well as the manufacture of cooktops with lower material thicknesses of 3 mm, for example, which fulfill the requirements set forth in accordance with EN 60335 or UL 858 or CSA 22.2.

These properties, which are apparently in part opposed to one another, are obtained by a coordinated interplay between the composition of the glass ceramic, on the one hand, and the ceramization method, on the other hand.

The method according to the invention for the production of the glass ceramic substrate according to the invention from an LAS glass with the above composition, starting from the glass melt, provides the following steps: refinement of the glass melt, forming of the precursor glass with cooling of the melt, subjection of the precursor glass produced in this way to a nucleation step and subsequently a crystal growth step, in which the HQSS grows on the crystal nuclei, subjection of the glass ceramic intermediate product precrystallized to this form with high-quartz solid solution (HQSS) as predominant crystal phase to a crystal transformation step, in which the HQSS crystal phase is transformed in part into a KSS crystal phase, wherein the crystal transformation step is carried out with a maximum temperature $T_{max}$ and over a residence time $t(T_{max})$ for this maximum temperature in a temperature-time region that is delimited by four straight lines, which connect the four corner points with the value pairs ($T_{max}$=910° C.; $t(T_{max})$=25 minutes), ($T_{max}$=960° C.; $t(T_{max})$=1 minute), ($T_{max}$=980° C.; $t(T_{max})$=1 minute), and ($T_{max}$=965° C.; $t(T_{max})$=25 minutes).

Starting from a precrystallized glass ceramic intermediate product with high-quartz solid solution (HQSS) as predominant crystal phase, the method according to the invention correspondingly begins with the crystal growth step. And starting from a precursor glass, the method according to the invention correspondingly begins with the nucleation step, which is followed by the crystal growth step and the crystal transformation step.

The glass ceramic composition in conjunction with the production method makes possible the creation of the above-mentioned layer structure and the crystal content as well as the transmission characteristic according to the invention and thus the advantageous material properties. The main crystal phase of the glass ceramic is then composed of KSS that is present in the composition range
$Li_{(1-2x-2y)}Mg_xZn_yAlSi_2O_6$-$Li_{(1-2x-2y)}Mg_{(x)}Zn_{(y)}AlSi_4O_{10}$
with ($0 \leq x \leq 0.5$; $0 \leq y \leq 0.5$ and $0 \leq x+y \leq 0.5$).

The ceramization program for crystal transformation according to the invention will be explained on the basis of FIG. 7. The inventors found that glass ceramics with the mentioned composition combine the desired properties only when they are ceramized under conditions that lie within the trapezoidal temperature-time region illustrated in FIG. 7, which is delimited by four straight lines that lie between the four corner points with the value pairs given in the following Table 1 (maximum ceramization temperature $T_{max}$; residence time $t(T_{max})$). Preferred values are also given in Table 1.

TABLE 1

|  | $T_{max}$ [° C.] | $t(T_{max})$ [min] |
| --- | --- | --- |
| Corner point 1 | 910, preferably 920 | 25, preferably 20 |
| Corner point 2 | 960 | 1, preferably 2 |
| Corner point 3 | 980 | 1, preferably 2 |
| Corner point 4 | 965 | 25, preferably 20 |

Figure 7:
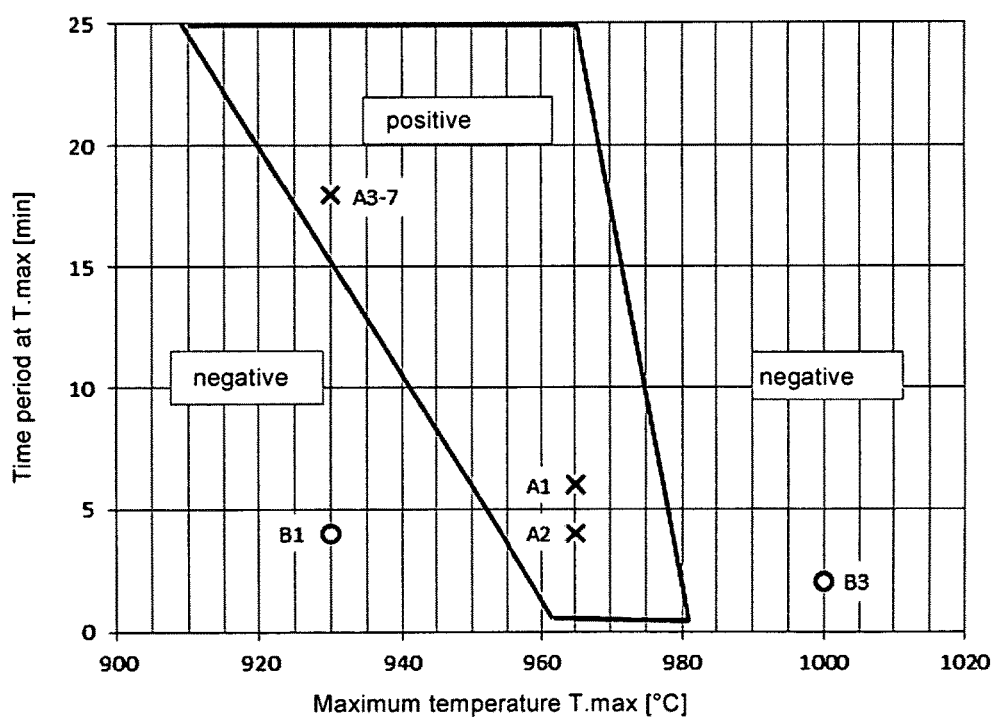
FIG. 7 is a temperature-time diagram for illustration of the ceramization parameters required for the production of the glass ceramic according to the invention.

By way of example, in the diagram according to FIG. 7, in which the residence time $t(T_{max})$ is plotted versus the maximum ceramization temperature $T_{max}$, the ceramics A1 to A3 according to the invention and the comparative examples B1 and B3 lying outside of the invention are entered. The temperature-time region of the ceramization parameters according to the invention is enclosed in a trapezoidal area, the corners of which have the coordinates from Table 1.

Preferably, the method according to the invention is enhanced in that the precursor glass or the glass ceramic intermediate product is heated over a time period of at most 60 minutes, preferably at most 45 minutes, and most preferably at most 30 minutes from room temperature to the maximum temperature $T_{max}$.

The advantage of this enhancement is that the ceramization conditions of the residence time $t(T_{max})$ and the maximum ceramization temperature $T_{max}$, which are relevant to the product properties and at which the ceramization processes and, above all, the phase transformation proceed in an especially controlled manner, are reached rapidly and the ceramization does not proceed already during the heating and thus in a less controlled manner.

A ceramization method that is markedly more economic, because it is more rapid, was developed for the production of a transparent, high-strength glass ceramic containing KSS. This ensues, for example, from the comparison with the method described in US 20140238971 A. Whereas the method according to the invention, including the time period for cooling to a temperature of 780° C., requires overall less than 60 min and preferably less than 50 min, ceramization methods that have been described in the prior art take at least 80 minutes to reach a comparable temperature in the region of the so-called cooling curve, that is, in the phase after the maximum temperature.

Owing to the short residence time at $T_{max}$, it is then guaranteed that the KSS is formed in a size distribution, in a mean overall size, and with a phase proportion that make possible the high strength together with a low light scattering and thus a transmission according to the invention. This is all the more surprising in that these ceramization conditions according to the invention could also be combined with a more economical and more rapid method than is described in the prior art.

It also appears that $SnO_2$ engages crucially as nucleating agent in the crystal formation process and crystal growth process. Thus, it was observed that the transformation from an Sn-containing, uncolored, transparent glass body to an opaque glass ceramic is markedly retarded in comparison to an As-refined glass body. This also appears to be the case for the material and process according to the invention, for which reason it is also possible in the wavelength range of 380 nm-500 nm to produce transparent glass ceramics that, at the same time, have a high proportion of keatite phase. This is ascribed to the retarded crystal growth and the resulting small crystallite sizes.

The production can be conducted with even more process reliability and the required product properties can be refined when the preferred parameters discussed below are maintained. The glass ceramic is preferably produced from an LAS glass that is free, apart from unavoidable traces, of arsenic and antimony and has at least 0.1 wt % $SnO_2$.

Fundamentally, the use of $SnO_2$ as an environmentally compatible reductant (in contrast to $Sb_2O_3$ or $As_2O_3$) during the refinement and as a redox partner for a coloring oxide, such as, for example, $V_2O_5$ and/or $Fe_2O_3$, for coloring of the glass ceramic is known from DE 199 39 787 C2. In particular, outstanding color effects and bubble qualities can be obtained in combination with a high-temperature refinement above 1700° C.

In regard to the coloring, it is especially preferred when, for the components $Fe_2O_3$ and $V_2O_5$ in the composition, the following condition is maintained: $1<Fe_2O_3/V_2O_5<8$.

Also in regard to the coloring, the ceramization conditions $T_{max}$ and $t(T_{max})$ are chosen in an optimum way such that a post-darkening of the already colored glass ceramic does not occur. Together with a shorter separation time for the nucleating agent and a shorter volume crystallization, a $\tau_{vis}$ of 0.5% is not undershot, even though passage through three regions that can contribute to the coloring and scattering occurs. Finally, any scattering is prevented, because the short ceramization period more or less "freezes" the low-scattering state.

The further coloring oxides in the composition comprise at least one substance from the group composed of the elements Cr, Mn, Co, Ni, Cu, Se, Mo, W, the oxides thereof, and metal oxides of rare earths. In particular, these are $Cr_2O_3$, $MnO_2$, MnO, CoO, $Co_2O_3$, NiO, $Ni_2O_3$, CuO, $Cu_2O$, SeO, further metal oxides of the rare earths, and molybdenum compounds. These coloring substances enable the color locations and/or transmission values to be adjusted in a more targeted manner in case of need. Preferably, the content of $Cr_2O_3$ should be <100 ppm in order not to restrict too strongly the transmission particularly in the spectral range from 380 nm to 500 nm; otherwise, there would ensue a negative effect on the display capability for white and blue LEDs or color displays.

Advantageously, the ZnO content is at least 0.2 wt %. ZnO is advantageous in regard to matching of the index of refraction between crystal phase and glass phase and thus has a positive effect on the transmission properties by minimization of the scatter. Moreover, the Zn-induced gahnite formation in non-colored glass ceramics serves to improve the lightness value L*.

The MgO content is preferably at least 0.1 wt % and most preferably at least 0.25 wt %. The upper limit of the MgO content lies at preferably 1 wt %.

Preferably, the $Al_2O_3$ content is 19-23 wt %. The $Al_2O_3$ content plays a crucial role in adjusting the Al/Si ratio in the KSS as well in the HQSS. In this way, it is possible, for example, to adjust the coefficient of thermal expansion of the glass ceramic. $Al_2O_3$ further has a positive effect on the chemical resistance of the glass ceramic.

Furthermore, it has been found to be advantageous when the $TiO_2$ content is 2.5-4 wt %.

The $ZrO_2$ content is preferably 0.5-1.9 wt %, more preferably 0.5-1.8 wt %, and most preferably 0.5-1.7 wt %.

Within these limits for $TiO_2$ and $ZrO_2$, the nucleation behavior is especially favorable. On the one hand, it needs to be ensured that sufficient nucleating agent (zirconium titanate) is present in order to ensure a rapid and homogeneous ceramization. On the other hand, contents of $TiO_2$ and, in particular, $ZrO_2$ that are too high lead to a devitrification or spontaneous nucleation already during forming of the precursor glasses, which also opposes a homogeneous ceramization and good transparency.

Preferably, the glass ceramic substrate has a glassy surface zone on the gradient layer with a thickness of 50-1000 nm, preferably 50-800 nm, most preferably 300-800 nm. This layer, which is formed by diffusion processes, particularly by diffusion of Li into the bulk or core, and thus brings about a Li enrichment in the interior and a depletion in the surface zone of the crystal, is to be evaluated as being positive in effect, particularly in terms of chemical attack processes.

It has been found to be advantageous when the crystal proportion of all crystalline phases in the core is at most 90%, preferably at most 85%, most preferably at most 80%. An advantageous lower limit of at least 69% can be given. Further crystalline secondary phases are HQSS, rutile, gahnite, and zirconium titanate. It has also been found to be advantageous when the total keatite proportion is less than 80%.

The crystallite proportion is important for the adjustment of the properties of the glass ceramic, in particular the thermal expansion. Because KSS exhibits a higher thermal expansion than HQSS, especially the KSS proportion needs to be limited in the way mentioned.

In order that an adequate transparency of the glass ceramic substrate is ensured, the crystallites of the KSS phase in the core of the glass ceramic are preferably <130 nm, determined as above by XRD/X-ray diffraction measurement.

The coefficient of thermal expansion $\alpha_{20/700}$ of the resulting glass ceramic is preferably less than $1.3 \times 10^{-6}$/K. As a result, it lies in the range of known translucent LAS glass ceramics with KSS as main crystal phase.

The temperature difference strength of the glass ceramic substrate according to the invention lies preferably at >800° C. The temperature difference strength of translucent KSS glass ceramics lies, by contrast, at typically 700° C.

The temperature difference strength (TUF) describes the resistance of a plate-shaped object made of glass or glass ceramic to local temperature gradients. In conjunction with the application as a cooktop, the test of the temperature difference strength is defined as follows: As test sample, a square cutout piece of the size 250 mm×250 mm of the glass ceramic panel to be tested is laid horizontally on a radiant heat element, which is typical of application and has an outer diameter of 180±3 mm, so as to lie tightly against it and is positioned asymmetrically in such that the four midpoints of each side of the measured sample protrude by 25±2 mm, 35±2 mm, 35±2 mm, 45±2 mm over the outer edge of the heating element. The heating element type 200N8-D2830R of the company Ceramaspeed Ltd. with the characteristics 2300 W/220 V is suited as a radiant heating element, for example. If the heating element is operated, a temperature gradient is created between the heated region and the cold outer edge of the measured sample. The heating process of the heating element is controlled in such a way that, after 5.0±0.5 minutes, fracture occurs owing to the temperature gradient. The maximum temperature thereby reached on the surface of the measured sample lying opposite the heating element is recorded as the characteristic value of the temperature difference strength. Based on the statistical nature of the temperature difference strength, this test is conducted on a series of at least 10 samples. The mean value of the measured value distribution is taken as the temperature difference strength of the test lot.

It is known that the strength of a plate made of glass or glass ceramic with respect to mechanically or thermally created tensile stresses is governed, among other things, by more or less incidental surface damage. In conjunction with the application as a cooktop, it may be assumed that the plate made of glass or glass ceramic experiences surface damage in the course of practical use, in particular by abrasive cleaning, cookware, etc. Any statement about the temperature difference strength, insofar as this is relevant to the intended use, therefore presumes of necessity some prior damage to the measured sample that corresponds to surface damage following conventional use in practice. According to experience, this can be achieved by sanding the surface of the measured sample with SiC sandpaper of 220 grain under an applied pressure of 1.2 N/cm². The person skilled in the art is familiar with the fact that the sanding is only fully effective on the occurrence of fracture when the sanding occurs particularly in those regions in which tensile stresses are created during the test, namely, in a sanding direction that is perpendicular to the respective main stress direction. This includes, in particular, a sanding of the cold edge of the measured sample in the region of its midpoints on each side and perpendicular to the outer edges thereof.

The glass ceramic substrate of the above-described type according to the invention finds application especially preferably as a covering for heating elements, in particular as a cooktop or roast top, as whiteware, as a heating element cover, as a grill top or fireplace panel, as a support plate or oven lining in the ceramic, solar, or pharmaceutical industry or in medical technology, in particular for production processes under cleanroom conditions, as a lining for ovens in which chemical or physical coating methods are carried out or as chemically resistant laboratory fixtures, as a glass ceramic article for high-temperature or extremely low-temperature applications, as a furnace window for combustion furnaces, as a heat shield for shielding of hot surroundings, as a cover for reflectors, floodlights, projectors, beamers, photocopiers, for applications involving thermomechanical loads, such as, for example, in night vision devices, or as wafer substrates, as translucent articles with UV protection, as material for housing components, for example, of electronic devices, and/or as glass cover screens for IT, such as cell phones, laptops, scanner glass plates, etc., or as facade plates, fire-resistant glazing, or as components for ballistic protection.

According to the investigations of the inventors, it may even be sufficient that only one composition component, the maximum temperature during the ceramization or the ceramization time, departs from the range stipulated by the invention for the required properties of the glass ceramic according to the invention or the glass ceramic substrate composed of it to be absent. The influence that the interacting parameters have on the result is seen from the following Table 2.

Table 2 compares 8 exemplary embodiments A0 to A3 to 4 comparative examples B1 to B4. Presented under the composition of the LAS glass ceramic are the relevant parameters of the ceramization, namely, the maximum ceramization temperature $T_{max}$ in ° C., the processing time (DLZ) in minutes, the residence time at the maximum ceramization temperature $t@T_{max}$ in minutes, and the heating rate to $T_{max}$ in Kelvin/minute. The parameters of processing time, residence time, and heating rate are each given initially as "actual" values; specifically, this means the way in which the ceramization of the respective example was carried out. The "preferred ranges" of these three parameters within which the ceramization has a successful outcome for the specific composition and the specific maximum ceramization temperature of the respective examples according to the invention follow below them. Listed underneath are the product parameters measured according to the above-described method in the following sequence: the phase content of the HQSS phase in %; the phase content of the KSS phase in %; the average crystallite size of the HQSS in nm, the average crystallite size of the KSS in nm (the phase contents as well as the crystallite sizes are each given in relation to the core (bulk) of the glass ceramic, measured on powdered samples); subjective optical transmission properties (colored, not colored); the measured transmission at a wavelength of 470 nm, standardized to a glass ceramic with a thickness of 4 mm, in %; the measured integral transmission $\tau_{vis}$ in the visible spectral range, standardized to a glass ceramic with a thickness of 4 mm, in %; the maximum scattered proportion ("haze"), standardized to a glass ceramic with a thickness of 4 mm, at a wavelength of 470 nm; the coefficient of thermal expansion $\alpha_{20/700°\,C.}$ between 20 and 700° C. in 1/K; the temperature difference strength (TUF) in ° C.; and the impact strength, determined in the ball drop test and given as mean value and as 5% fractile, each in cm, as well as determined in the CIL method and given in N.

All exemplary embodiments are KSS-forming in terms of the invention, which means that they have a dominant KSS phase proportion in the core. This also applies to the comparative examples B2 and B3. The other comparative examples do not form any KSS or only form it to a slight extent. By contrast, examples B2 and B3 show that the crystals become too large, this being ascribed to the maximum ceramization temperature in conjunction with the residence time. It results from this that these glass ceramics are not sufficiently transparent, but rather are instead translucent. Example B1 shows that, owing to the slight formation of KSS, the strength-increasing effect does not occur. The example is therefore deficient in display capability.

TABLE 2

| A (Exemplary embodiments) | | | | |
|---|---|---|---|---|
| Example | | A0 | A1 | A2 | A3 |

| Composition | | | | | |
|---|---|---|---|---|---|
| Al2O3 | % | 20.780 | 20.780 | 20.780 | 20.500 |
| As2O3 | % | | | | |
| BaO | % | 2.260 | 2.260 | 2.260 | 2.380 |
| CaO | % | 0.430 | 0.430 | 0.430 | 0.360 |
| CeO2 | % | | | | |
| Cr2O3 | % | | | | 0.030 |
| F | % | | | | |
| Fe2O3 | % | 0.094 | 0.094 | 0.094 | 0.088 |
| K2O | % | 0.260 | 0.260 | 0.260 | 0.220 |
| Li2O | % | 3.900 | 3.900 | 3.900 | 3.830 |
| MgO | % | 0.310 | 0.310 | 0.310 | 0.200 |
| MnO2 | % | | | | |
| Na2O | % | 0.620 | 0.620 | 0.620 | 0.500 |
| Nd2O3 | % | | | | |
| NiO | % | | | | |
| P2O5 | % | 0.092 | 0.092 | 0.092 | 0.093 |
| Sb2O3 | % | 0.018 | 0.018 | 0.018 | |
| SiO2 | % | 64.840 | 64.840 | 64.840 | 65.500 |
| SnO2 | % | 0.260 | 0.260 | 0.260 | 0.290 |
| SrO | % | 0.017 | 0.017 | 0.017 | |
| TiO2 | % | 3.120 | 3.120 | 3.120 | 3.030 |
| V2O5 | % | 0.025 | 0.025 | 0.025 | 0.016 |
| ZnO | % | 1.490 | 1.490 | 1.490 | 1.500 |
| ZrO2 | % | 1.410 | 1.410 | 1.410 | 1.380 |
| TOTAL | | 99.926 | 99.926 | 99.926 | 99.917 |

| Parameters of the ceramization | | | | | |
|---|---|---|---|---|---|
| Tmax. | ° C. | 930 | 965 | 965 | 930 |
| DLZ (actual) | min | 139.4 | 45.4 | 45.4 | 139.4 |
| t@Tmax. (actual) | min | 18 | 6 | 4 | 18 |
| Heating rate to Tmax. (actual) | K/min | 25 | 30 | 18 | 25 |
| DLZ (preferred range) | min | <150 | <50 | <50 | <150 |
| t@Tmax. (preferred range) | min | <25 | <10 | <8 | <25 |
| Heating rate to Tmax. (preferred range) | K/min | >15 | >3 | >10 | >15 |

TABLE 2-continued

| Structure in the volume/bulk | | | | | |
|---|---|---|---|---|---|
| Phase content HQSS | % | 15 | — | 12 | 21 |
| Phase content KSS | % | 57 | 78 | 57 | 53 |
| Phase content HQSS | nm | not determined | | not determined | not determined |
| Crystallite size KSS | nm | 128 | | 128 | 128 |

| Transmission (in relation to thickness 4 mm) | | | | | |
|---|---|---|---|---|---|
| @ 470 nm | % | 0.360% | 0.450% | 0.370% | |
| @ 400-500 nm | % | | | | |
| $\tau_{vis}$ | | 1.200% | 1.500% | 1.300% | |

| Haze | | | | | |
|---|---|---|---|---|---|
| @ 470 nm | | | 9% | 13% | |
| $\alpha_{20-700}$ | | 0.18 | 1.08 | 0.68 | |
| TUF | ° C. | | >800° C. | >800° C. | |

| Impact strength | | | | | |
|---|---|---|---|---|---|
| Mean value | cm | 48.3 ± 3.8 | 46.2 ± 5.6 | 36.0 ± 3.8 | |
| 5%-Fractile | cm | 42 | 37 | 30 | |
| CIL at 10% ambient humidity | N | >1.00 | 0.98 ± 0.06 | 0.84 ± 0.07 | |
| CIL at 1% ambient humidity | N | 1.75 | 1.20 | 1.03 | 1.26 |

| B (Comparative examples) | | | | | |
|---|---|---|---|---|---|
| Example | | B1 | B2 (712-8) | B3 (712-6) | B4 |

| Composition | | | | | |
|---|---|---|---|---|---|
| Al2O3 | % | 20.780 | 20.780 | 20.780 | 22.000 |
| As2O3 | % | | | | |
| BaO | % | 2.260 | 2.260 | 2.260 | 1.180 |
| CaO | % | 0.430 | 0.430 | 0.430 | 0.035 |
| CeO2 | % | | | | |
| Cr2O3 | % | | | | |
| F | % | | | | |
| Fe2O3 | % | 0.094 | 0.094 | 0.094 | 0.014 |
| K2O | % | 0.260 | 0.260 | 0.260 | 0.300 |
| Li2O | % | 3.900 | 3.900 | 3.900 | 3.780 |
| MgO | % | 0.310 | 0.310 | 0.310 | 0.720 |
| MnO2 | % | | | | |
| Na2O | % | 0.620 | 0.620 | 0.620 | 0.380 |
| Nd2O3 | % | | | | |
| NiO | % | | | | |
| P2O5 | % | 0.092 | 0.092 | 0.092 | 1.470 |
| Sb2O3 | % | 0.018 | 0.018 | 0.018 | |
| SiO2 | % | 64.840 | 64.840 | 64.840 | 65.500 |
| SnO2 | % | 0.260 | 0.260 | 0.260 | 0.300 |
| SrO | % | 0.017 | 0.017 | 0.017 | |
| TiO2 | % | 3.120 | 3.120 | 3.120 | 2.090 |
| V2O5 | % | 0.025 | 0.025 | 0.025 | |
| ZnO | % | 1.490 | 1.490 | 1.490 | |
| ZrO2 | % | 1.410 | 1.410 | 1.410 | 2.230 |
| TOTAL | | 99.926 | 99.926 | 99.926 | 99.999 |

| Parameters of the ceramization | | | | | |
|---|---|---|---|---|---|
| Tmax. | ° C. | 930 | 1120 | 1000 | 930 |
| DLZ (actual) | min | 45.4 | 120.0 | 120.0 | 139.4 |
| t@Tmax. (actual) | min | 4 | 1 | 1 | 18 |
| Heating rate to Tmax. (actual) | K/min | 15 | 40 | 40 | 25 |
| DLZ (preferred range) | min | | | | |

TABLE 2-continued

| | | | | | |
|---|---|---|---|---|---|
| t@Tmax. (preferred range) | min | | | | |
| Heating rate to Tmax. (preferred range) | K/min | | | | |
| Structure in the volume/bulk | | | | | |
| Phase content HQSS | % | 69 | — | — | 57 |
| Phase content KSS | % | 3 | 82 | 81 | 7 |
| Phase content HQSS | nm | 51 | — | — | |
| Crystallite size KSS | nm | not determined | 164 | 138 | |
| Transmission (in relation to thickness 4 mm) | | | | | |
| @ 470 nm | % | 0.440% | 0.000% | 0.000% | |
| @ 400-500 nm | % | | | | |
| $\tau_{vis}$ | | 1.500% | 0.000% | | |
| Haze | | | | | |
| @ 470 nm | | 4% | | 27% | |
| $\alpha_{20-700}$ | | 0.11 | 1.29 | 1.29 | |
| TUF | ° C. | >800° C. | 550° C. | 500° C. | |
| Impact strength | | | | | |
| Mean value | cm | 19.0 ± 2.7 | 29.0 ± 6.0 | 29.0 ± 6.0 | 21.2 ± 7.0 |
| 5%-Fractile | cm | 15 | 18 | 18 | 10 |
| CIL at 10% ambient humidity | N | 0.69 ± 0.05 | | | |
| CIL at 1% ambient humidity | N | 0.84 | | | |

What is claimed is:

1. A glass ceramic substrate made of a transparent, colored LAS glass ceramic comprising a composition (in wt %):
   $Al_2O_3$ 18-23,
   $Li_2O$ 3.0-4.2,
   $SiO_2$ 60-69,
   ZnO 0-2,
   $Na_2O+K_2O$ 0.2-1.5,
   MgO 0-1.5,
   CaO+SrO+BaO 0-4,
   $B_2O_3$ 0-2,
   $TiO_2$ 2.3-4,
   $ZrO_2$ 0.5-2,
   $P_2O_5$ 0-3,
   $SnO_2$ 0-<0.6,
   $Sb_2O_3$ 0-1.5,
   $As_2O_3$ 0-1.5,
   $TiO_2+ZrO_2+SnO_2$ 3.8-6,
   $V_2O_5$ 0.01-0.06, and
   $Fe_2O_3$ 0.03-0.2,
   wherein the LAS glass ceramic has a gradient layer and an underlying core, and
   wherein the LAS glass ceramic has keatite solid solution (KSS) as a predominant crystal phase in the underlying core and has high-quartz solid solution (HQSS) as a predominant crystal phase in the gradient layer,
   further comprising a depth profile of the HQSS and KSS crystal phase proportions, wherein the KSS crystal phase has a proportion in any depth ≥20 μm that exceeds 50% of a sum of the HQSS and KSS crystal phase proportions.

2. The glass ceramic substrate according to claim 1, further comprising coloring oxides in sum total to a maximum of 1.0 wt %.

3. The glass ceramic substrate according to claim 1, wherein the LAS glass ceramic has a fracture strength, expressed in a CIL value, of at least 0.8 N in the case of an ambient humidity of 10% and/or a CIL value of at least 0.98 N in the case of an ambient humidity of 1%.

4. The glass ceramic substrate according to claim 1, wherein the depth profile of the HQSS and KSS crystal phase proportions is achieved by phase transformation of HQSS crystals to KSS crystals during ceramization with a maximum temperature $T_{max}$ and over a residence time $t(T_{max})$ of this maximum temperature in a temperature-time region that is delimited by four straight lines, which connect the four corner points with the value pairs ($T_{max}$=910° C.; $t(T_{max})$=25 minutes), ($T_{max}$=960° C.; $t(T_{max})$=1 minute), ($T_{max}$=980° C.; $t(T_{max})$=1 minute), and ($T_{max}$=965° C.; $t(T_{max})$=25 minutes),
   wherein the ceramization method, including the time period for cooling to a temperature of 780° C., requires overall less than 60 min.

5. A glass ceramic substrate made of a transparent, colored LAS glass ceramic comprising a composition (in wt %):

| | |
|---|---|
| $Al_2O_3$ | 18-23, |
| $Li_2O$ | 3.0-4.2, |
| $SiO_2$ | 60-69, |
| ZnO | 0-2, |
| $Na_2O + K_2O$ | 0.2-1.5, |
| MgO | 0-1.5, |
| CaO + SrO + BaO | 0-4, |
| $B_2O_3$ | 0-2, |
| $TiO_2$ | 2.3-4, |
| $ZrO_2$ | 0.5-2, |
| $P_2O_5$ | 0-3, |
| $SnO_2$ | 0-<0.6, |
| $Sb_2O_3$ | 0-1.5, |
| $As_2O_3$ | 0-1.5, |
| $TiO_2 + ZrO_2 + SnO_2$ | 3.8-6, |
| $V_2O_5$ | 0.01-0.06, and |
| $Fe_2O_3$ | 0.03-0.2, | wherein the LAS glass ceramic has a gradient layer and an underlying core,
   wherein the LAS glass ceramic has keatite solid solution (KSS) as a predominant crystal phase in the underlying core and has high-quartz solid solution (HQSS) as a predominant crystal phase in the gradient layer, and
   wherein the LAS glass ceramic has a fracture strength, expressed in a CIL value, of at least 0.8 N at an ambient humidity of 10% and/or a CIL value of at least 0.98 N at an ambient humidity of 1%.

6. The glass ceramic substrate according to claim 5, further comprising coloring oxides in sum total to a maximum of 1.0 wt %.

7. The glass ceramic substrate according to claim 5, wherein the fracture strength is achieved by phase transformation of HQSS crystals to KSS crystals during ceramization with a maximum temperature $T_{max}$ and over a residence time $t(T_{max})$ of this maximum temperature in a temperature-time region that is delimited by four straight lines, which connect the four corner points with the value pairs ($T_{max}$=910° C.; $t(T_{max})$=25 minutes), ($T_{max}$=960° C.;

$t(T_{max})$=1 minute), ($T_{max}$=980° C.; $t(T_{max})$=1 minute), and ($T_{max}$=965° C.; $t(T_{max})$=25 minutes)

wherein the ceramization method, including the time period for cooling to a temperature of 780° C., requires overall less than 60 in.

8. The glass ceramic substrate according to claim 5, wherein the LAS glass ceramic has a maximum scattered proportion, standardized to a glass ceramic with a thickness of 4 mm, is at most 15% at a wavelength of 470 nm.

9. The glass ceramic substrate according to claim 8, wherein the maximum scattered proportion does not exceed 20% in a wavelength range from 400 nm to 500 nm.

10. The glass ceramic substrate according to claim 5, wherein the LAS glass ceramic
is free of arsenic and antimony, apart from unavoidable traces, and contains at least 0.1 wt % $SnO_2$.

11. The glass ceramic substrate according to claim 5, wherein the composition meets a condition $1 < Fe_2O_3/V_2O_5 < 8$.

12. The glass ceramic substrate according to claim 6, wherein the coloring oxides comprise at least one substance selected from the group consisting of Cr, Mn, Co, Ni, Cu, Se, Mo, W, oxides thereof, and metal oxides of rare earths.

13. The glass ceramic substrate according to claim 5, wherein the LAS glass ceramic has an integral visual transmission in the visible range, standardized to a glass ceramic with a thickness of 4 mm, of $\tau_{vis, 4\,mm}$<=5%.

14. The glass ceramic substrate according to claim 5, wherein the LAS glass ceramic has a spectral transmission, standardized to a glass ceramic with a thickness of 4 mm, of >0.1% at a wavelength of 470 nm and/or of >0.25% at a wavelength of 550 nm.

15. The glass ceramic substrate according to claim 5, further comprising a glassy surface zone on the gradient layer, the glassy surface zone has a thickness of 300-1000 nm.

16. The glass ceramic substrate according to claim 5, wherein the underlying core has a crystal proportion that is at most 82%.

17. The glass ceramic substrate according to claim 5, wherein the substrate is configured for a use selected from the group consisting of a covering for a heating element, whiteware, a grill top, a fireplace panel, a support plate, an oven lining, chemically resistant laboratory fixtures, a high-temperature article, an extremely low-temperature article, a furnace window for combustion furnaces, a heat shield for shielding of hot surroundings, a cover for reflectors, floodlights, projectors, beamers, photocopiers, an article exposed to thermomechanical loads, night vision device, wafer substrate, translucent articles with UV protection, material for housing components, electronic devices, glass cover screens for IT, cell phone, laptop, scanner glass plate, facade plate, fire-resistant glazing, and ballistic protection.

18. A glass ceramic substrate made of a transparent, colored LAS glass ceramic comprising a composition (in wt %):

| | |
|---|---|
| $Al_2O_3$ | 18-23, |
| $Li_2O$ | 3.0-4.2, |
| $SiO_2$ | 60-69, |
| ZnO | 0-2, |
| $Na_2O + K_2O$ | 0.2-1.5, |
| MgO | 0-1.5, |
| CaO + SrO + BaO | 0-4, |
| $B_2O_3$ | 0-2, |
| $TiO_2$ | 2.5-4, |
| $ZrO_2$ | 0.5-2, |
| $P_2O_5$ | 0-3, |
| $SnO_2$ | 0-<0.6, |
| $Sb_2O_3$ | 0-1.5, |
| $As_2O_3$ | 0-1.5, |
| $TiO_2 + ZrO_2 + SnO_2$ | 3.8-6, |
| $V_2O_5$ | 0.01-0.06, and |
| $Fe_2O_3$ | 0.03-0.2, | wherein the LAS glass ceramic has a gradient layer and an underlying core, and wherein the LAS glass ceramic has keatite solid solution (KSS) as a predominant crystal phase in the underlying core and has high-quartz solid solution (HQSS) as a predominant crystal phase in the gradient layer, further comprising a depth profile of the HQSS and KSS crystal phase proportions, wherein the KSS crystal phase has a proportion in any depth ≥20 μm that exceeds 50% of a sum of the HQSS and KSS crystal phase proportions, wherein the depth profile of the HQSS and KSS crystal phase proportions is achieved by phase transformation of HQSS crystals to KSS crystals during ceramization with a maximum temperature $T_{max}$ and over a residence time $t(T_{max})$ of this maximum temperature in a temperature-time region that is delimited by four straight lines, which connect the four corner points with the value pairs ($T_{max}$=910° C.; $t(T_{max})$=25 minutes), ($T_{max}$=960° C.; $t(T_{max})$=1 minute), ($T_{max}$=980° C.; $t(T_{max})$=1 minute), and ($T_{max}$=965° C.; $t(T_{max})$=25 minutes), and wherein the ceramization method, including the time period for cooling to a temperature of 780° C., requires overall less than 60 min.

19. A glass ceramic substrate made of a transparent, colored LAS glass ceramic comprising a composition (in wt %):

| | |
|---|---|
| $Al_2O_3$ | 18-23, |
| $Li_2O$ | 3.0-4.2, |
| $SiO_2$ | 60-69, |
| ZnO | 0-2, |
| $Na_2O + K_2O$ | 0.2-1.5, |
| MgO | 0-1.5, |
| CaO + SrO + BaO | 0-4, |
| $B_2O_3$ | 0-2, |
| $TiO_2$ | 2.3-4, |
| $ZrO_2$ | 0.5-2, |
| $P_2O_5$ | 0-3, |
| $SnO_2$ | 0-<0.6, |
| $Sb_2O_3$ | 0-1.5, |
| $As_2O_3$ | 0-1.5, |
| $TiO_2 + ZrO_2 + SnO_2$ | 3.8-6, |
| $V_2O_5$ | 0.01-0.06, and |
| $Fe_2O_3$ | 0.03-0.2; and | wherein the LAS glass ceramic has a gradient layer and an underlying core, wherein the LAS glass ceramic has keatite solid solution (KSS) as a predominant crystal phase in the underlying core and has high-quartz solid solution (HQSS) as a predominant crystal phase in the gradient layer, wherein the LAS glass ceramic has a fracture strength, expressed in a CIL value, of at least 0.8 N at an ambient humidity of 10% and/or a CIL value of at least 0.98 N at an ambient humidity of 1%, wherein the fracture strength is achieved by phase transformation of HQSS crystals to KSS crystals during ceramization with a maximum temperature $T_{max}$ and over a residence time $t(T_{max})$ of this maximum temperature in a temperature-time region that is delimited by four straight lines, which connect the four corner points with the value pairs ($T_{max}$=910° C.; $t(T_{max})$=25 minutes), ($T_{max}$=960° C.; $t(T_{max})$=1 minute), ($T_{max}$=980° C.; $t(T_{max})$=1 minute), and ($T_{max}$=965° C.; $t(T_{max})$=25 minutes), and wherein the ceramization method, including the time period for cooling to a temperature of 780° C., requires overall less than 60 min.

* * * * *